United States Patent [19]
Nishimoto et al.

[11] Patent Number: 5,485,067
[45] Date of Patent: Jan. 16, 1996

[54] ELECTRIC POWER STEERING APPARATUS

[75] Inventors: Mitsuhiko Nishimoto, Kashihara; Hirofumi Matsuoka, Kyoto; Hiroki Amako, Kashiwara, all of Japan

[73] Assignee: Koyo Seiko Co., Ltd., Osaka, Japan

[21] Appl. No.: 270,055

[22] Filed: Jul. 1, 1994

[30] Foreign Application Priority Data

Jul. 2, 1993 [JP] Japan .................................. 5-191700
Jul. 5, 1993 [JP] Japan .................................. 5-192026

[51] Int. Cl.⁶ ..................................................... G05B 5/00
[52] U.S. Cl. .......................... 318/466; 318/432; 318/434
[58] Field of Search ........................... 318/466, 43, 432; 180/79.1, 141, 142; 364/24.05, 424.01

[56] References Cited

U.S. PATENT DOCUMENTS

| | | |
|---|---|---|
| 4,629,952 | 12/1986 | Shimizu . |
| 4,881,611 | 11/1989 | Nakashima et al. . |
| 4,896,735 | 6/1990 | Morishita et al. . |
| 4,957,182 | 9/1990 | Morishita et al. ...................... 180/79.1 |
| 4,971,173 | 11/1990 | Takahashi ................................ 180/141 |
| 4,984,647 | 1/1991 | Morishita et al. ...................... 180/79.1 |
| 5,029,466 | 7/1991 | Nishihara et al. . |
| 5,202,830 | 4/1993 | Tsurumiya et al. ..................... 180/79.1 |
| 5,335,979 | 8/1994 | Naitou et al. .......................... 180/79.1 |

FOREIGN PATENT DOCUMENTS

| | | |
|---|---|---|
| 336682 | 3/1989 | European Pat. Off. . |
| 536590 | 9/1992 | European Pat. Off. . |
| 2200608 | 8/1988 | United Kingdom . |

*Primary Examiner*—William M. Shoop, Jr.
*Assistant Examiner*—Karen Masih
*Attorney, Agent, or Firm*—Darby & Darby

[57] ABSTRACT

An electric power steering apparatus which is provided with a CPU for outputting a drive control signal of an electric motor for assisting the steering force on the basis of the detected steering torque, and a drive inhibition circuit for outputting a signal to stop the operation of the electric motor when the direction of the electric motor operation and the direction of the detected steering torque are opposite to each other, the output of the drive inhibition circuit is inputted to the CPU, which monitors the normal or abnormal condition of the drive inhibition circuit. While the abnormal condition of the CPU continues for a predetermined time period, the drive stop condition of the electric motor is kept. When the detected torque is not smaller than the predetermined value, the drive of the electric motor in the direction opposite to that of the detected torque is inhibited.

6 Claims, 11 Drawing Sheets

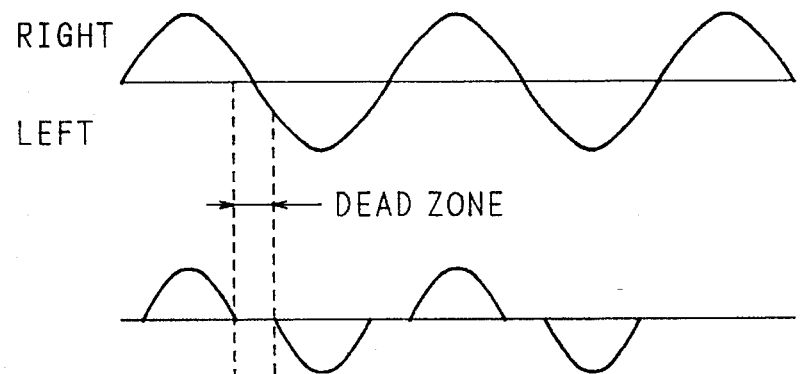
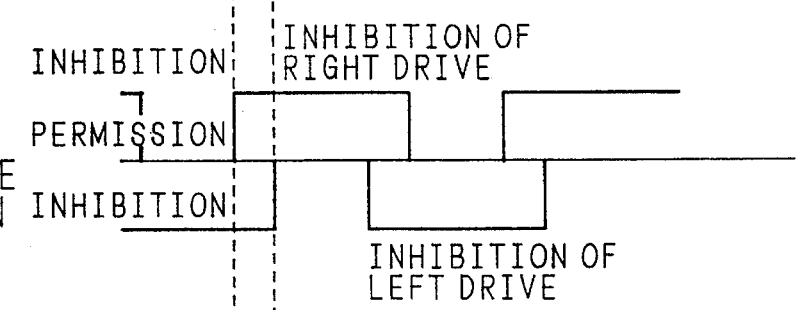
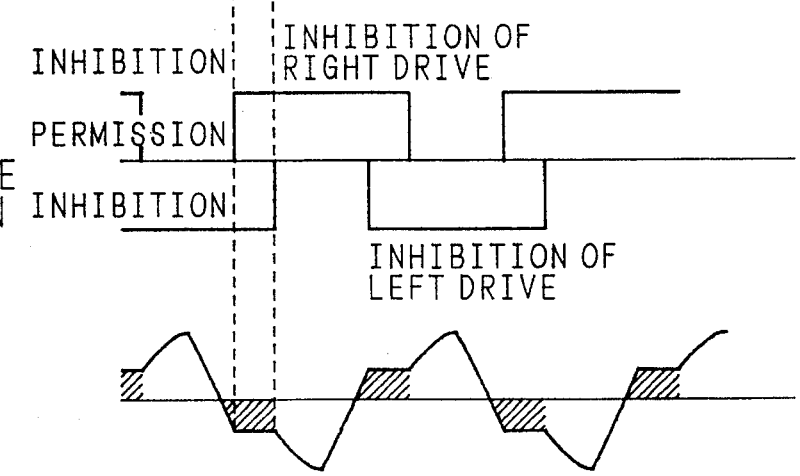
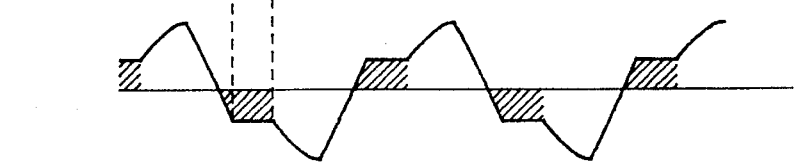
FIG. 10A RIGHT TORQUE / LEFT — DEAD ZONE
FIG. 10B CURRENT OF TABLE
FIG. 10C OUTPUT OF MOTOR DRIVE INHIBITION — INHIBITION / PERMISSION / INHIBITION — INHIBITION OF RIGHT DRIVE / INHIBITION OF LEFT DRIVE
FIG. 10D DRIVE CURRENT

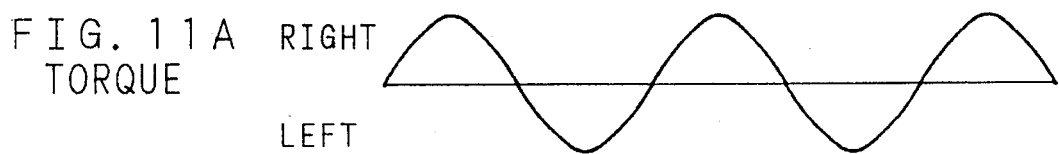
FIG. 11A RIGHT TORQUE / LEFT
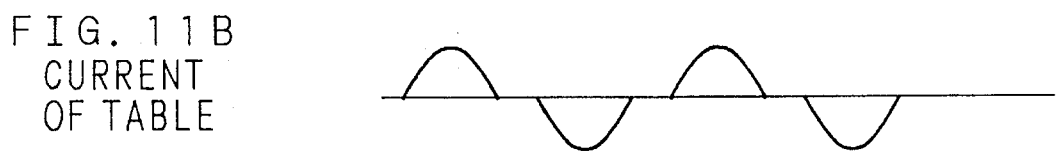
FIG. 11B CURRENT OF TABLE
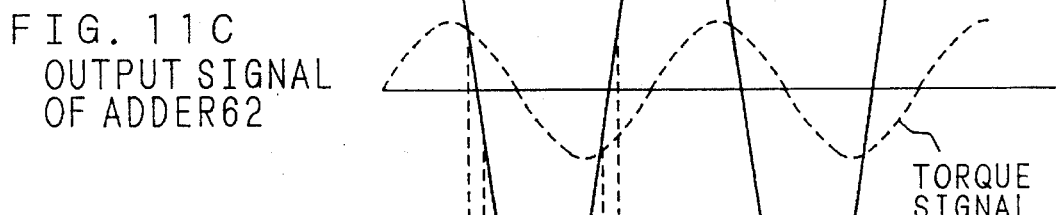
FIG. 11C OUTPUT SIGNAL OF ADDER62
TORQUE SIGNAL
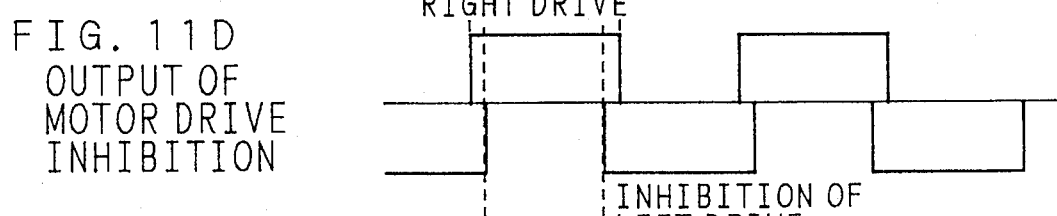
INHIBITION OF RIGHT DRIVE
FIG. 11D OUTPUT OF MOTOR DRIVE INHIBITION
INHIBITION OF LEFT DRIVE
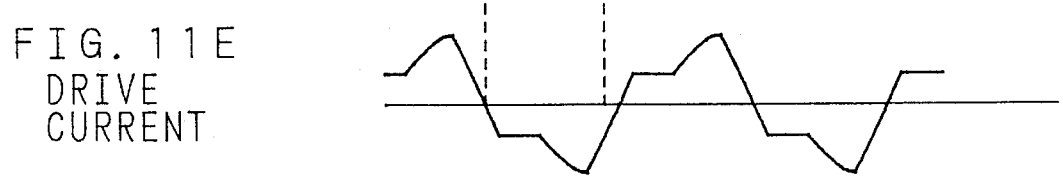
FIG. 11E DRIVE CURRENT

ELECTRIC POWER STEERING APPARATUS

BACKGROUND OF THE INVENTION

1. Field of the Invention

The present invention relates to an electric power steering apparatus. More particularly, it proposes an improved electric power steering apparatus.

2. Description of Related Art

The electric power steering apparatus serves to detect the steering torque and to assist the steering force by the rotation of an electric motor which is driven according to the detected torque.

FIG.1 is a block diagram showing an outline construction of a conventional electric power steering apparatus. The output of a torque sensor 2 provided at the steering shaft (not shown) is inputted in a CPU 1 through an AMP (amplifier) 3, wherein first the A/D conversion is carried out. The CPU 1 stores in its memory a table of the relation between the detected torque values and the target values of the drive current for an electric motor 5, and reads out the target current corresponding to the input torque. In the CPU 1, the deviation is calculated between the read-out target current and the feedback drive current of the motor 5 which is detected by a drive current detecting resistor and a drive current detector circuit 9 to be inputted in the CPU 1. The deviation is dealt in PI calculation, thereby the control variable is calculated, so that the PWM wave signal corresponding to the variable and the drive control signal indicating the rotary direction of the motor 5 are made out to be given to an FET driving circuit 4.

The motor 5 is connected to four switch transistors 8a, 8b, 8c, 8d in a H-bridge and the FET driving circuit 4 outputs a gate signal respectively to make the transistors 8a, 8d "on" for the leftward rotation and to make the transistors 8b, 8c "on" for the rightward rotation. Incidentally, the transistors 8c, 8d are always "on" for its rotation and the transistors 8a, 8b are driven by the PWM wave signal.

A drive inhibition circuit 7 is provided for a countermeasure against the runaway in the CPU 1, and the outputs from AMP 3 are respectively given to the minus input of a comparator 71 and the plus input of a comparator 72. The plus input of the comparator 71 and the minus input of the comparator 72 are respectively given threshold voltages VR, VL corresponding to R, L shown in FIG.2 by a voltage divider 73.

FIG.2 shows a relation between the detected torque (axis of abscissas) and the drive current (axis of ordinates) outputted from the CPU 1 for the motor, and represents that the rightward drive of the motor 5 is inhibited in case of the detected torque not greater than R including the dead zone and that the leftward drive is also inhibited in case of the torque not smaller than L. The outputs from the comparators 71, 72 are respectively given to the bases of switch transistors 74, 75. The emitters of the transistors 74, 75 are at earth potential and the collectors are respectively connected to the gates of the transistors 8c, 8d.

Consequently, when the output of the detected torque from AMP 3 becomes lower than VR, the output from the comparator 71 becomes "H" level, and the transistor 74 is turned "on", thereby the gate of the transistor 8c is forced to the "L" level, so that the rightward rotation of the motor 5 is inhibited despite of the output of the FET driving circuit 4. When the output from AMP 3 becomes higher than VL, similarly the gate of the transistor 8d is forcibly made to the "L" level, thereby the leftward rotation of the motor 5 is inhibited. Thus, in the zone where the direction of the detected torque and the direction of the motor drive are different, the operation of the motor is inhibited so that no conflict arises.

Next, FIG.3 is a block diagram showing the outline construction of the conventional electric power steering apparatus wherein the operation within the CPU 1 is clarified. In FIG.3, the same parts as those in FIG.1 are designated with the same numbers. The output of the torque sensor 2 provided at the steering shaft (not shown) is inputted through an interface 43 into the CPU 1, wherein first the A/D conversion (51) is carried out, and next the phase compensation (52) is performed. The CPU 1, stores in its memory a target current table (53) showing the relation between the detected torque values and the target values of the drive current for an electric motor 5, and reads out the target current corresponding to the input torque. The output of the A/D conversion is also differentiated (58), and the result is added to the target current (54). This differential value is added for the inertial compensation of the motor 5.

The deviation is calculated (55) between the result in the above-described addition and the feedback drive current of the motor 5 which is detected by the drive current detector 9 to be subjected to A/D conversion (59) in CPU 1. The deviation is dealt in PI operation (56), thereby the control variable is calculated, so that the PWM wave signal corresponding to the variable and the drive control signal indicating the rotary direction of the motor 5 are made out (57). Those signals are given to a driving circuit 40 constructed as an H-type bridge composed of the motor 5 and the four switch transistors. Although not illustrated here, the vehicle speed information detected by the vehicle speed sensor is also inputted into the CPU 1, and the table of the target currents corresponding to the information is read out.

The operation of the drive inhibition circuit 7 provided as the countermeasure against a runaway in the CPU 1 is the same as the above-described conventional case, and its operational characteristic is shown in FIG.2.

In such a conventional electric power steering apparatus, the protection against the runaway in the CPU 1 is performed by the drive inhibition circuit 7, while the abnormal condition of the drive inhibition circuit 7 can not be detected. As a result, when the CPU 1 assumes a runaway in an open fault of the transistors 74, 75, it is feared that no protection against the runaway is performed, thereby the system operates in an abnormal condition. Further, when the assistance for the motor is inhibited owing to the runaway in the CPU 1 while the drive inhibition circuit 7 operates in a normal condition, the steering torque increases, but when the CPU 1 returns to the normal condition, the steering torque decreases. As a result, according to the mode of the runaway in the CPU 1, the increase and decrease of the steering torque is repeated, so that the steering feeling deteriorates, and a feeling of uneasiness is produced.

Furthermore, since the detected torque is compensated for phase in the CPU 1, and also is added with the differential value, a situation may arise in which the torque is in the right direction during a detection in a certain moment, while the direction to drive the motor in the rotation is in the left direction. As a result, there is a conflict problem that although the motor would be preferably rotated in the manner described above, the rotation in the left direction or the motor has been inhibited. This situation occurs for the steering in the dead zone and its vicinity, and it is a task to take a countermeasure against the deterioration of the steering feeling.

SUMMARY OF THE INVENTION

An object of the present invention is to provide an electric power steering apparatus wherein the abnormal conditions of the drive inhibition circuit may be detected by a CPU which monitors the output from the drive inhibition circuit, and in case of the abnormal condition the operation of an electric motor may be stopped.

Another object of the invention is to provide an electric power steering apparatus wherein a drive control signal for an electric motor and the output from the drive inhibition circuit are compared, and if the abnormal condition of the CPU continues in a predetermined time, the drive stop condition of the motor is maintained.

A further object of the invention is to provide an electric power steering apparatus wherein the countermeasure against the runaway in the CPU is taken without any interference to the control with the phase compensation and the differential additive operation by changing the setup for the drive inhibition zone of the motor.

The electric power steering apparatus of the present invention is provided with a processor (CPU) which outputs a drive control signal for an electric motor assisting the steering force on the basis of the detected steering torque, and a drive inhibition circuit which outputs a signal to stop the operation of the motor when the direction of the motor drive and the direction of the detected steering torque are opposite to each other. The output from the drive inhibition circuit is adapted to be inputted to the processor, which judges the normal or abnormal condition of the drive inhibition circuit according to the input. Consequently, since the processor monitors the signal from the drive inhibition circuit, it can detect the abnormal condition of the drive inhibition circuit according to the deviation of the signal from the result of the calculation in the processor, and thereby it can perform the operation such as to stop the drive of the motor.

Another electric power steering apparatus of the invention comprises the above-described electric power steering apparatus which is provided with a logic circuit for judging the agreement between the drive control signal representing the direction of the motor drive and the output signal from the drive inhibition circuit, and keeps the drive stop of the motor when the abnormal condition of the processor detected by the output from the logic judging circuit continues for a predetermined time period. Accordingly, when there is a disagreement between the signal from the drive inhibition circuit and the signal representing the driving direction of the motor relating to the output from the processor, and when such a condition continues for a predetermined time period, the drive stop of the motor is maintained, and thereby the apparatus can prevent the deterioration of the steering feeling owing to the repetition of the runaway in the processor and the recovery to the normal condition.

Further, in the electric power steering apparatus of the invention, the drive inhibition zone of the motor is, as shown in FIG.4, defined that it is on the opposite side to the detected torque and is larger than the predetermined torque value, and it is provided with means for comparing the detected torque and the predetermined torque value, and means for inhibiting the drive of the motor in the direction opposite to that of the detected torque when the detected torque is not smaller than the predetermined torque value. Namely, the inhibition zone is set up in an area where the torque value is larger than L, R which is slightly larger than the torque in the dead zone as shown in FIG.4. Therefore, even if the direction of the drive current according to the phase control and the differential additive operation becomes opposite to the direction of the detected torque, the detected torque value in this case is smaller than the boundary values L, R of the inhibition zone, so that the drive of the motor is permitted, the desired assistance to the steering is carried out, and the deterioration is avoided in the steering feeling. Furthermore, upon the reversal of the direction owing to a runaway in the CPU, the drive of the motor in the opposite direction to the detected torque is permitted in the zone (the dead zone side from the boundary L, R) near the boundary of the inhibition zone in which the drive of the motor is inhibited. In this situation, the drive current of the motor is slight.

The electric power steering apparatus of the invention is further provided with a first circuit for calculating the differential signal of the signal corresponding to the detected torque, a second circuit for calculating the sum of the differential signal calculated in the first circuit and the signal corresponding to the detected torque, and means for inhibiting the drive of the motor according to the sum calculated in the second circuit.

The above and further objects and features of the invention will more fully be apparent from the following detailed description with accompanying drawings.

BRIEF DESCRIPTION OF THE DRAWINGS

FIGS.10A–10D are wave form diagrams of a conventional electric power steering apparatus;

FIGS.11A–11E are wave form diagrams of an electric power steering apparatus of the invention.

DESCRIPTION OF THE PREFERRED EMBODIMENTS

Hereinafter, the present invention will be described according to the drawings showing its embodiments.

Figure 5:
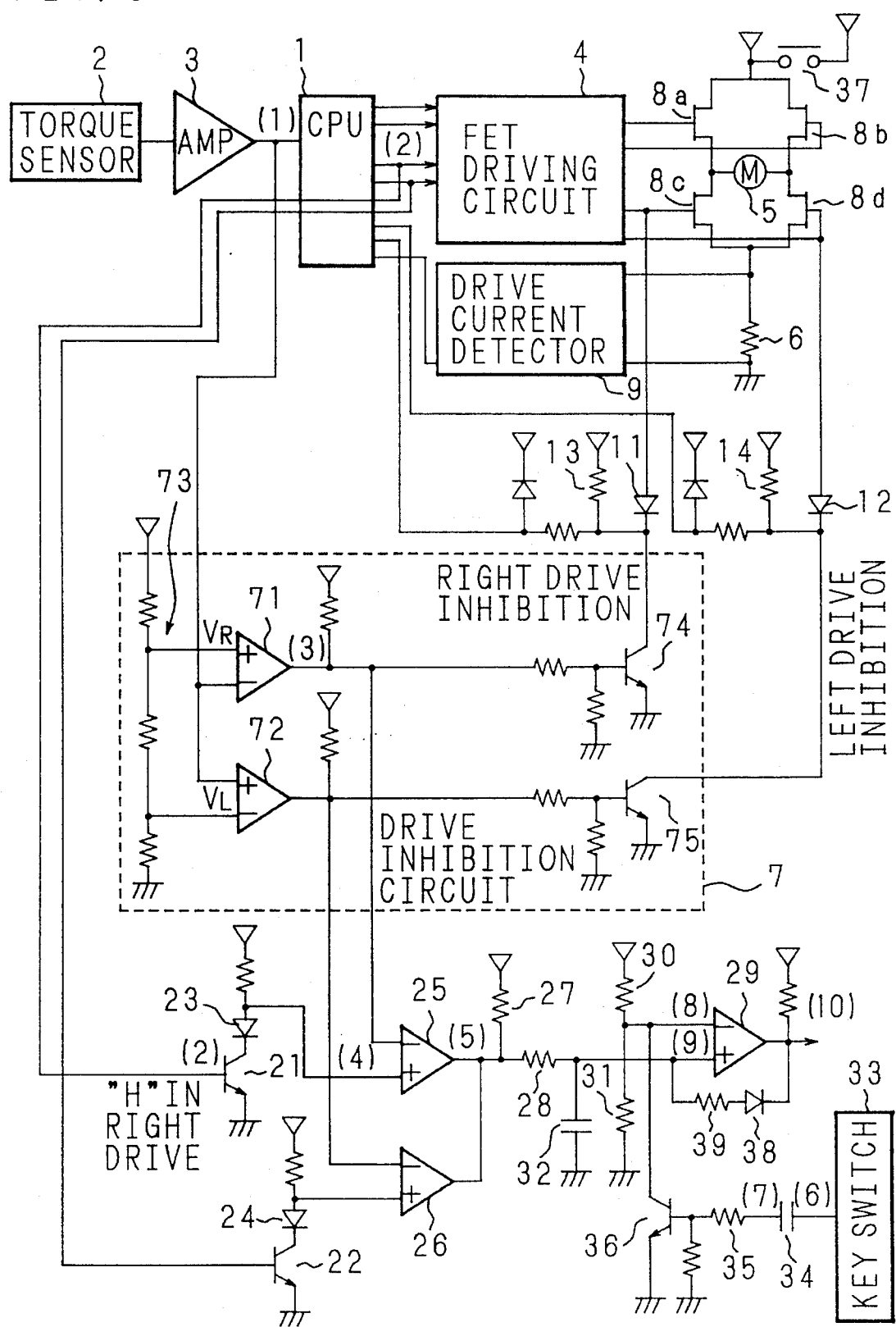
FIG.5 is a block diagram of an electric power steering apparatus of the invention.

FIG.5 is a schematic block diagram of an electric power steering apparatus according to the first embodiment of the present invention. The output of a torque sensor 2 provided at a steering shaft (not shown) is inputted in a CPU 1 through an AMP 3, wherein first the A/D conversion is carried out. The CPU 1 stores in its memory a table showing the relation between the detected torque values and the target values of the drive current for an electric motor 5, and reads out the target current corresponding to the input torque. In the CPU 1, the deviation is calculated between the read-out target current and the feedback drive current of the motor 5 which is detected by a drive current detecting resistor 6 and a drive current detector 9 to be inputted in the CPU 1. The deviation is dealt in PI operation, whereby the control variable is calculated, so that the PWM wave signal corresponding to the variable and the drive control signal indicating the rotary direction of the motor 5 are made out to be given to an FET driving circuit 4.

The motor 5 is connected to four switch transistors 8a, 8b, 8c, 8d in a H-bridge and FET driving circuit 4 which outputs a gate signal respectively to make the transistors 8a, 8d "on" For the leftward rotation and to make the transistors 8b, 8c "on" for the rightward rotation. Incidentally, the transistors 8c, 8d are always "on" for its rotation and the transistors 8a, 8b are driven by the PWM wave signal.

A drive inhibition circuit 7 is provided for a countermeasure against the runaway in the CPU 1, and the outputs from AMP 3 are respectively given to the minus input of a comparator 71 and the plus input of a comparator 72. The plus input of the comparator 71 and the minus input of the comparator 72 are respectively given threshold voltages VR, VL corresponding to R, L shown in FIG.2 by a voltage divider 73.

Figure 1:
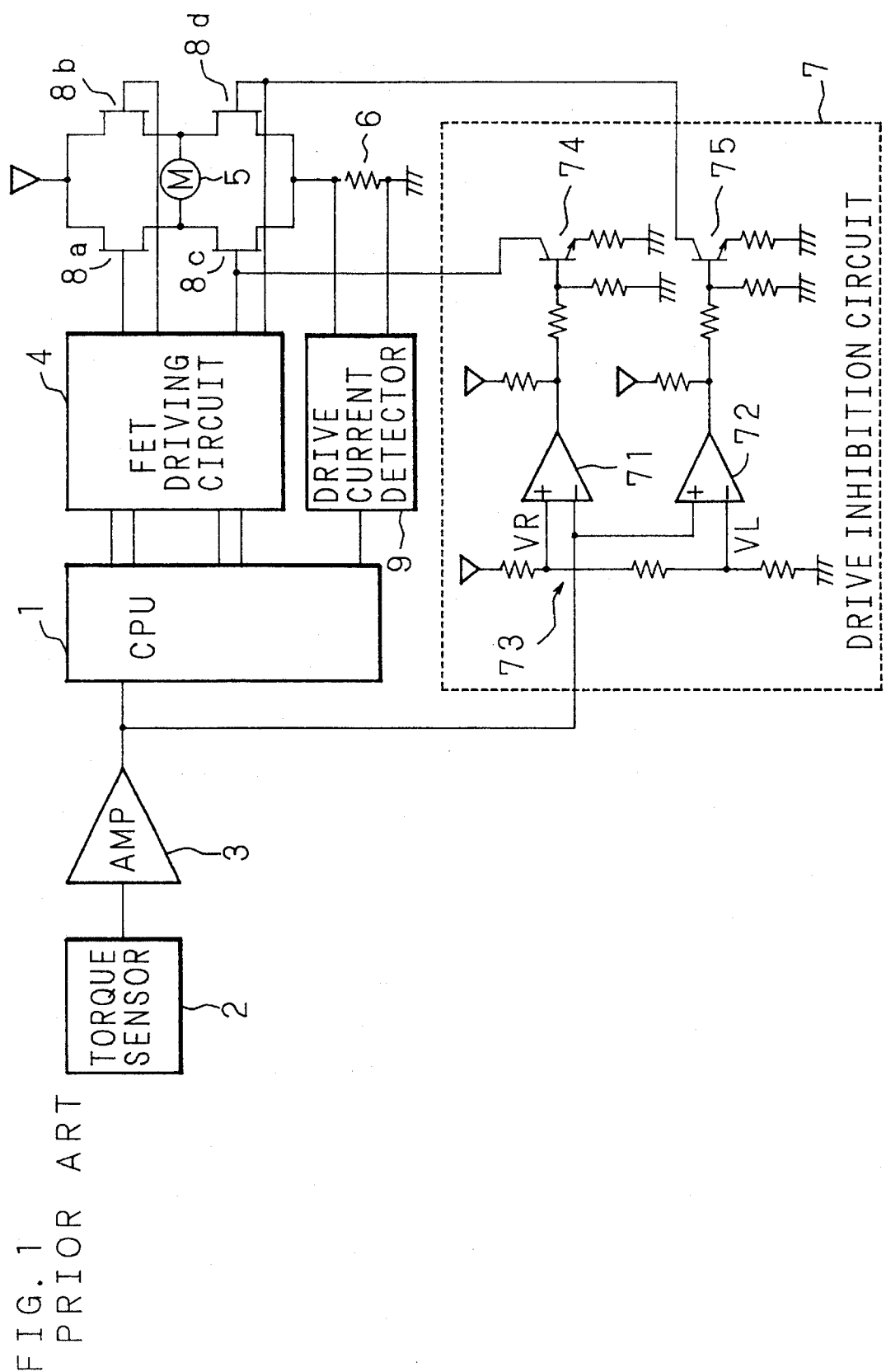
FIG.1 is a block diagram of a conventional electric power steering apparatus.
Figure 2:
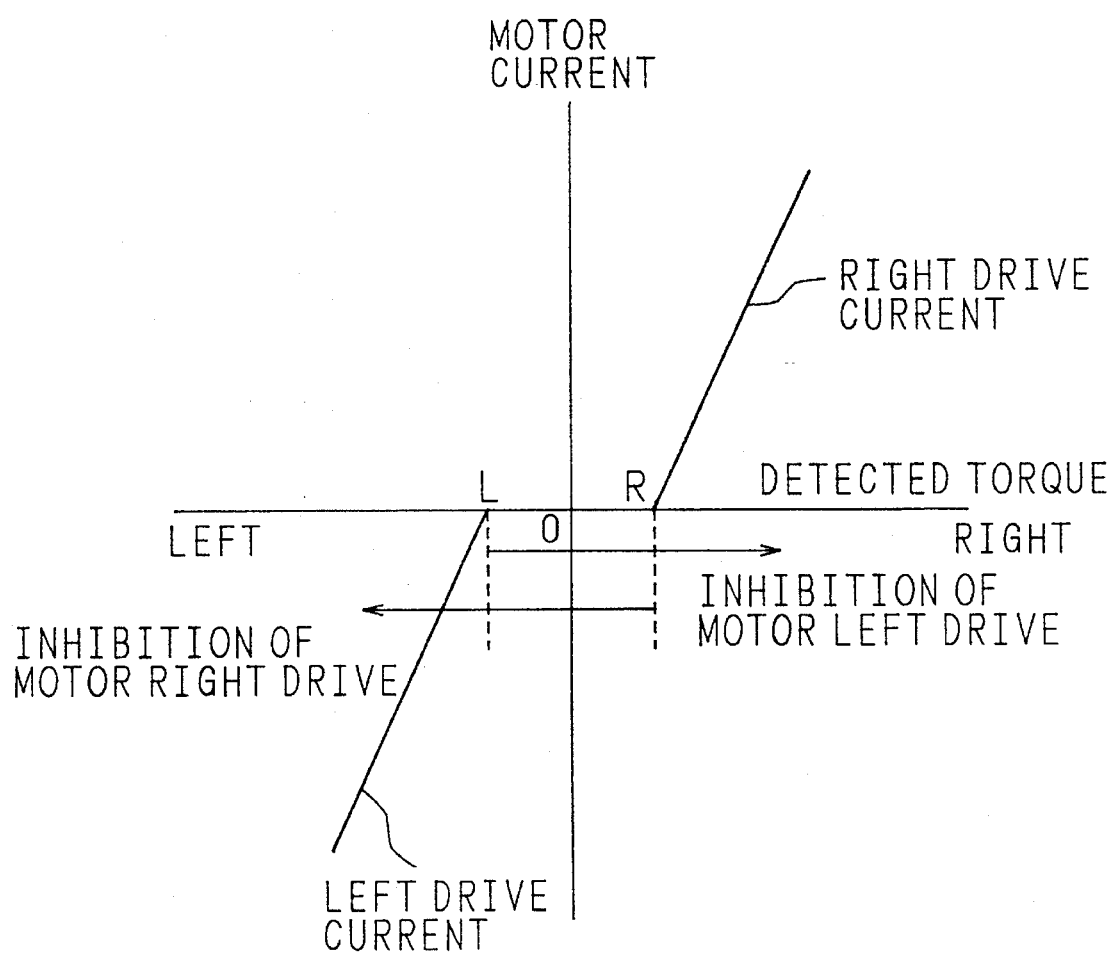
FIG.2 is a characteristic diagram of a drive inhibition circuit.

FIG.2 shows a relation between the detected torque (axis of abscissas) and the drive current, (axis of ordinates) outputted from the CPU 1 for the motor, and represents that the rightward drive of the motor 5 is inhibited in case of the detected torque not greater than R including the dead zone and that the leftward drive is also inhibited in case of the torque not smaller than L. The outputs from the comparators 71, 72 are respectively applied to the bases of the switch transistors 74, 75. The emitters of the transistors 74, 75 are at earth potential and the collectors are respectively connected through diodes 11, 12 to the gates of the transistors 8c, 8d.

When the output of the detected torque from AMP 3 becomes lower than VR, the output from the comparator 71 becomes the "H" level, and the transistor 74 is made "on", thereby the gate of the transistor 8c is forced to the "L" level, so that the rotary operation of the motor 5 in the rightward direction is inhibited despite of the output of the FET driving circuit 4. When the output from AMP 3 becomes higher than VL, similarly the gate of the transistor 8d is forcibly made "L" level, thereby the rotary operation of the motor 5 in the leftward direction is inhibited.

The electric potentials at the junctions of the collectors of respective transistors 74, 75 and each cathode of the diodes 11, 12 are adapted to be read in the CPU 1, and the junctions are pulled up with the respective resistors 13, 14. Namely, the CPU 1 can discriminate and detect the occurrence of the inhibition signal against the rightward or leftward drive according to the "L" level of the electric potentials at the above-mentioned modes.

On the other hand, the output signals from the CPU 1 indicating the respective directions of the rightward or the leftward rotation are given to the respective bases of transistors 21, 22. The collectors of the transistors 21, 22 are connected through the resistors and diodes 23, 24 to the power source voltage and the emitters are at earth potential. The anodes of the diodes 23, 24 are connected to the respective plus input terminals of comparators 25, 26, of which the minus input terminals are connected to the respective output terminals of the comparators 71, 72.

The output terminals of the comparators 25, 26 are connected in common at a junction which is pulled up by a resistor 27, and stretched through a resistor 28 to the plus input terminal of a comparator 29. The minus input terminal of a comparator 29 is given the intermediate node potential of the voltage divider composed of resistors 30, 31. A capacitor 32 is provided between the plus input terminal of the comparator 29 and the earth potential. A key switch 33 of the automobile, which is equipped with the electric power steering apparatus of the invention, outputs the signal of "H" level at key-on. This key signal is given through a condenser 34 a resistor 35 to the base of a transistor 36.

The base of the transistor 36 is pulled down and the emitter is grounded. Further, the collector is connected to the minus input terminal of the comparator 29. The output terminal of the comparator 29 is pulled up, and connected through a diode 38 and a resistor 39 to its plus input terminal. The output from the comparator 29 is applied to a relay coil (not shown) of a fail-safe relay 37 provided in the feed circuit of the motor.

Figure 6:
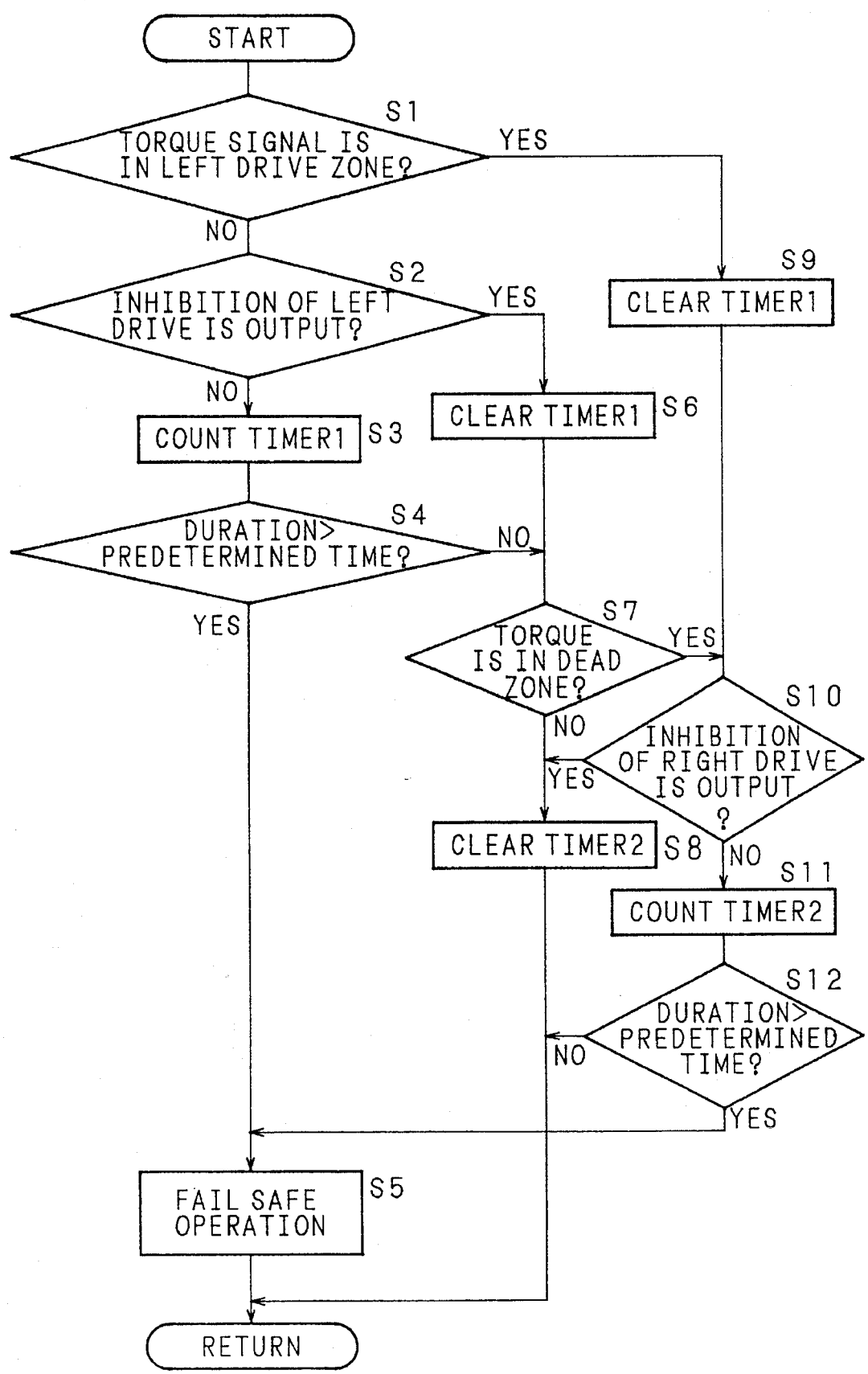
FIG.6 is a flow chart showing the processing steps for operating the drive inhibition circuit.

The operation monitoring of the drive inhibition circuit 7 by the CPU 1 will be described in the first embodiment constructed as explained above. FIG.6 is a flow chart showing the operation steps for the monitoring of the drive inhibition circuit 7 by the CPU 1.

The torque signal inputted from AMP 3 is examined whether it is in the left drive zone or not (S1). This means that the torque is examined whether it is in the left side from L or not. In the case of YES (the torque is in the left drive zone), a timer 1 in the CPU (S9), and next cleaned it (S10) is examined whether the output of the right drive inhibition signed is emitted or not according to the input from the diode 11.

In the case of NO, the condition is abnormal, as seen in FIG.2, in other words when the detected torque is in the left drive zone and the output of the right drive inhibition is not emitted. Consequently, a CPU count timer 2 is counted for clocking the duration of this condition (S11). Then, the duration of this condition is examined (S12), and this routine is repeated for a predetermined period of time. And, when the clocked value of the timer 2 has reached the predetermined value, the abnormal condition of the drive inhibition circuit 7, particularly of the comparator 71 side, namely the right drive inhibition side, is detected and the fail-safe operation is performed (S5).

When the step S1 is NO (the torque signal is in the right zone from L in FIG.2), it is examined whether the output of the left drive inhibition from diode 12 of FIG. 5 is emitted or not (S2). When the output is not emitted (NO), this condition is abnormal, as seen in FIG.2, so that the time period is clocked by the timer CPU 1 (S3). And, when this condition has continued for the predetermined time period (S4: YES), the abnormal condition of the drive inhibition circuit 7, particularly of the comparator 72 side, namely the left drive inhibition side is detected, and the fail-safe operation is performed (S5).

When the condition is normal in the step S2 (YES), the timer 1 is cleared (S6), and the detected torque is examined whether it is in the dead zone or not (S7). It is the same with the case of NO in the step (S4). When the torque is not in the dead zone, the torque signal is in the right drive zone, so that the timer 2 is made clear (S8). When the torque is in the dead zone, it is examined whether the output from the right drive inhibition is emitted or not in (S10). Then, if the output is not emitted, it means that the signal of the right drive inhibition is not emitted while the torque is located between L and R, so that the abnormal condition is counted with the timer 2 (S11).

In short, the CPU 1 can detect the occurrence of the abnormal condition in the drive inhibition circuit, 7 by monitoring the content of the timers 1, 2.

Figure 7:
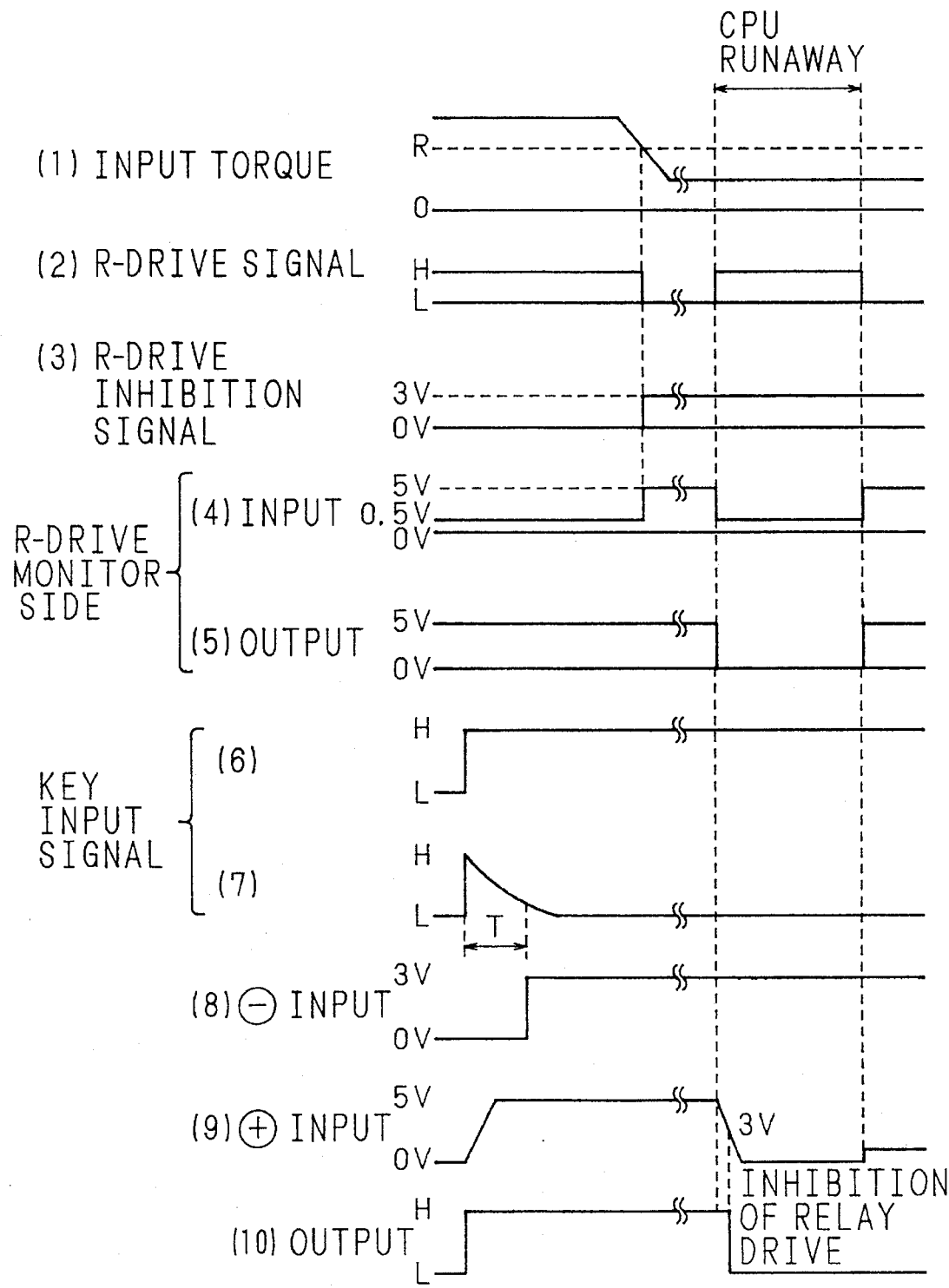
FIG.7 is a time chart for describing the operation of the electric power steering apparatus of the invention.

Next, a description will be made, according to FIG.7, of the detection of the abnormal condition by comparing the drive control signal from CPU 1 and the output from the drive inhibition circuit 7. FIG.7 is a time chart showing the changes of the potentials in the several portions on lines (1)–(10) in FIG.5. The left side represents the normal condition immediately after the key switch 33 is turned "on", and the right side represents the condition in which a runaway is occurred in the CPU 1. The output of the key switch 33 is designated as (6), and the output (7) of the condenser 34 is its differential signal. Along with this, the transistor 36 is "on" during the time period T, and the voltage of the minus input terminal of the comparator 29 is 0 V. As a result, even if the output (10) of the comparator 29 would be LOW immediately after the key switch is turned "on", the potential at the minus input terminal (8) is lower than the potential at the plus input terminal (9), and the output (10) from the comparator 29 is at an "H" level. Consequently, the input of the plus input terminal (9) rises by the charge of the condenser and is larger than the voltage at the minus input terminal which is determined by the ratio of the divided voltages at the resistors 30, 31 even when the transistor 36 changes from "on" to "off". As a result, the output (10) of the comparator 29 keeps the condition of "H" level, makes the relay 37 "on", and establishes a condition in which the feed to the motor 5 is possible.

On the other hand, assumes that the output (1) of the AMP 3 is such that the potential values higher than R in FIG.2 define the rightward drive zone and the potential values lower than L define the leftward drive zone. Accordingly, in the initial area in the left side of FIG.7, the signal (2) of the rightward drive command in CPU 1 is in "H" level. At this time, the output (3) of the comparator 71 to emit the inhibition signal of the rightward drive is at the "L" level. Although the output of the comparator 72 relating to the inhibition of the leftward drive is not illustrated, it is in "H" level at this time.

Since the signal (2) of the rightward command is at the "H" level, the transistor 21 turns "on", so that the plus input (4) of the comparator 25 is at the "L" level (the voltage corresponding to the voltage down in the forward direction of the diode 23, for example, 0.5 V). At this time, since the output (3) is in "L" level (0 V), the output (5) of the comparator 25 is in "H" level. When the torque input enters the leftward drive zone as shown in the drawing, the signals of lines (2), (3), (4) are reversed.

Now, as shown in the right side of FIG.7, when a runaway of the CPU 1 occurs and the rightward drive signal (2) becomes "H" level while the input torque (1) is in the leftward drive zone, the transistor 21 turns "on". On the other hand, at this time, since the minus input of the comparator 71 is lower than its plus input VR, the output (3) of the comparator 71 is in "H" level. Accordingly, the output of the comparator 25 becomes "L" level, and the potential at the plus input terminal (9) of the comparator 29 is discharged through the resistor 28. When the potential becomes lower than the voltage (which is determined by the ratio of the divided voltages of the resistors 30, 31) at the minus input terminal (8) of the comparator 29, the output (10) of the comparator 29 becomes "L" level, the fail-safe relay 37 turns "off", and the feed to the motor is shut down.

As the result of the output (10) of the comparator 29 becoming "L" level, the runaway in the CPU 1 returns to the normal condition, and the plus input terminal (9) of the comparator 29 is kept to be lower than the minus input terminal (8) even if the output (5) of the comparator 25 becomes "H" level. Accordingly, the fail-safe relay 37 is kept in the "off" condition.

As described above, in the first embodiment, the CPU 1 can detect the abnormal condition of the drive inhibition circuit 7 by the clocked contents or the like of the CPU timers 1, 2. Furthermore, according to the judgment of the agreement between the drive control signal of the CPU 1 and the drive inhibition signal of the drive inhibition circuit 7, the fail-safe condition is kept when the abnormal condition in the CPU 1 is continued for the predetermined time period. Thereby, the feeling of discord in the steering sensation owing to the repetition of the runaway of the CPU 1 and the recovery to the normal condition can be prevented, and the safe steering assisted with the electric power can be realized.

Embodiment 2

Figure 8:
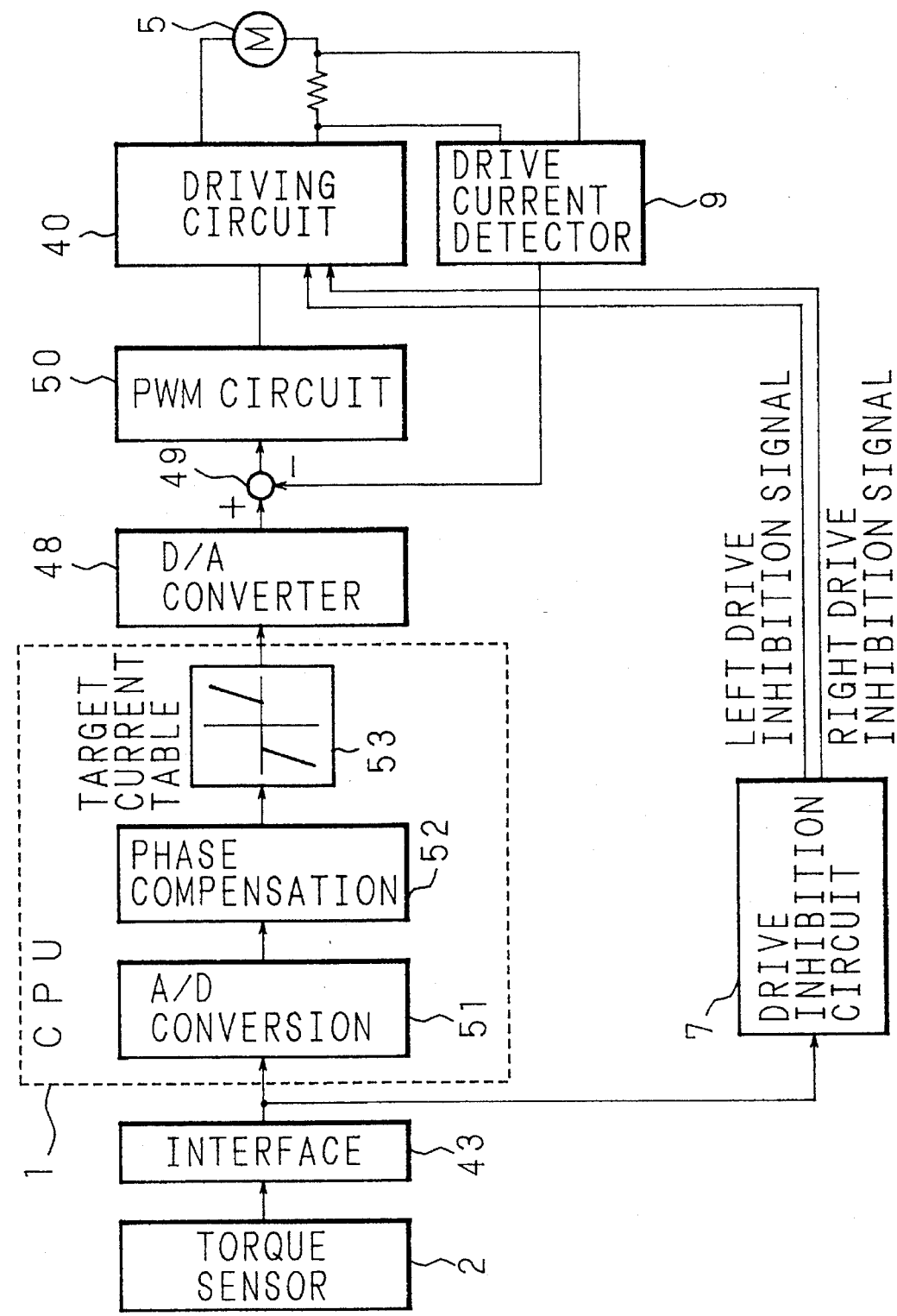
FIG.8 is a block diagram of a another embodiment of the electric power steering apparatus of the invention.

FIG.8 is a block diagram showing an electric power steering apparatus according to the second embodiment of the present invention. The output of a torque sensor 2 provided at the steering shaft (not shown) is inputted through an interface 43 in the CPU 1 and in the drive inhibition circuit 7 for limiting the drive direction of the motor 5. In the CPU 1, first the A/D conversion is carried out (51), and after the phase compensation is performed (52), the access to the target current table (53) is carried out according to the torque value. As a result, the target drive current proportioned to the detected torque for the motor 5 is obtained. The objective current thus obtained is inputted in a D/A converter 48 outside the CPU 1 and converted in an analog value to be applied to an adder 49.

The actual drive current of the motor 5 is detected in the drive current detector 9, and the feedback current is applied to the adder 49, in which the deviation from the output of the D/A converter 48 is calculated. This deviation is inputted in a PWM circuit 50, in which the PWM signal is developed to be applied to a driving circuit 40 of the motor 5 and a signal for commanding the rotary direction. The driving circuit 40 is an H-bridge circuit composed of four switch transistors and the motor 5.

The drive inhibition circuit 7 examines the magnitude and the direction of the detected torque, and when there is inputted a torque in the right (left) rotating direction larger than the boundary value L (R) of the left (right) drive inhibition zone, the output signal of left (right) drive inhibition is supplied to the driving circuit 40. The signal of the left (right) drive inhibition is connected so that the conducting one of the switch transistors in the driving circuit 40 during the rotation in the left (right) direction may be made in the nonconducting condition. As a result, when the direction of the detected torque is different from the direction to drive the motor or the direction commanded by the operation of the CPU 1 and the magnitude of the torque is larger than the value of L, R, the rotation of the motor 5 is inhibited, so that the risk due to the CPU runaway is avoided.

On the other hand, there may be a case where the direction of the drive current calculated in the CPU 1 is different from the direction of the detected torque because of the phase compensation. However, if the values of L, R are selected so that the torque corresponding to this drive current may be kept in the range between L and R, the assistance to the steering force can be performed without obstructing the effect of the phase compensation.

Embodiment 3

Figure 9:
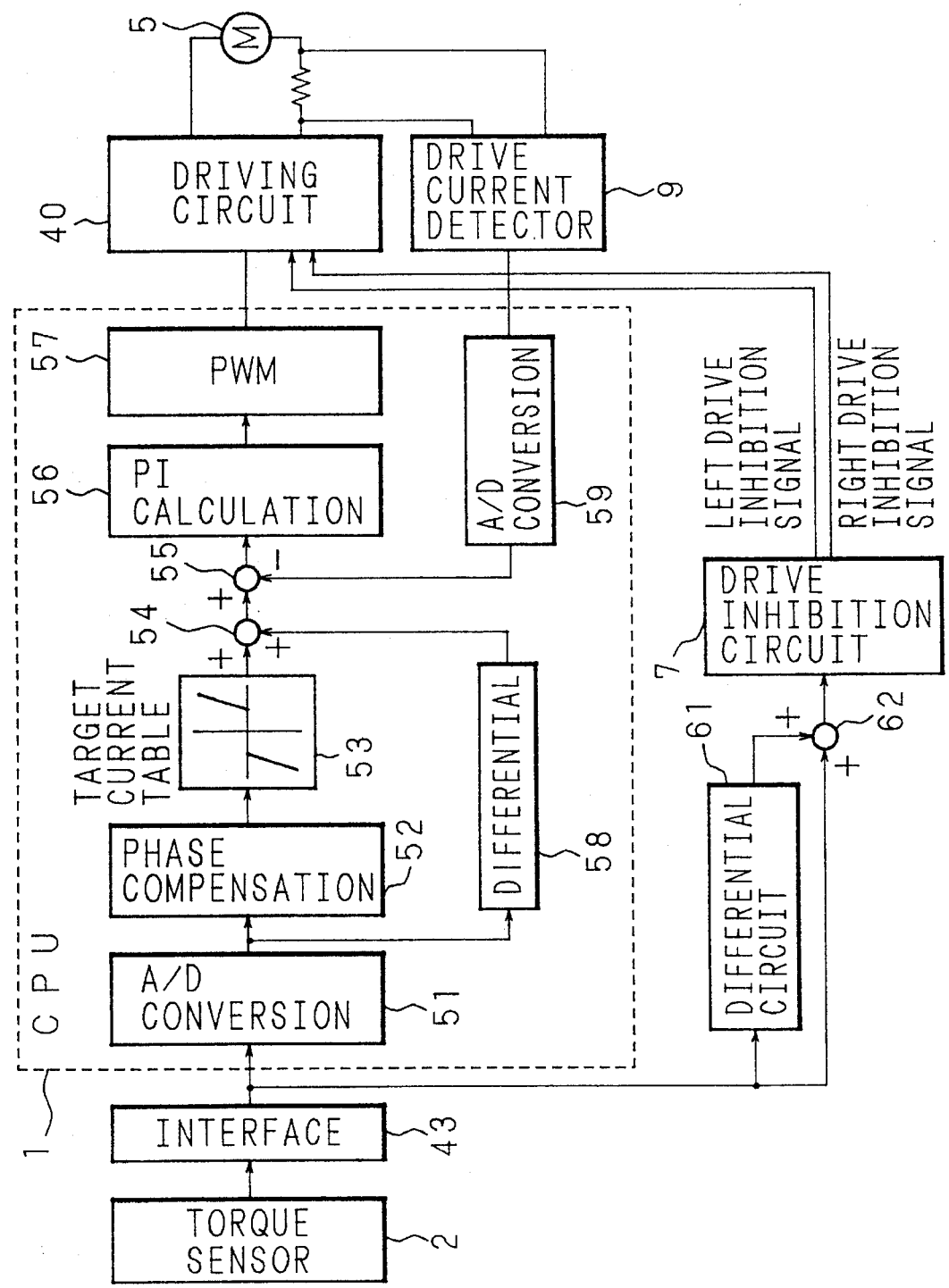
FIG.9 is a block diagram of a further embodiment of the electric power steering apparatus of the invention.

FIG.9 is a block diagram of an electric power steering apparatus according to the third embodiment of the present invention. The output of a torque sensor 2 is inputted through an interface 43 in the CPU 1, and as the second embodiment, first the A/D conversion is carried out (51), and after the phase compensation is performed (52), the access to the target current table (53) is carried out according to the torque value. As a result, the target drive current proportioned to the detected torque for the motor 5 is obtained. Further, the output of the A/D conversion is differentiated (58), and the result is added to the target current (54).

The deviation is calculated (55) between the result in the above-described addition and the feedback drive current of the motor 5 which is detected by the drive current detect or 9 to be subjected to A/D conversion (59) in the CPU 1. A control variable is calculated out of the deviation in PI operation (56), and thereby the PWH wave signal corresponding to the variable and the drive control signal indicating the rotary direction of the motor 5 (57) are produced. These signals are applied to a driving circuit 40 constructed as an H-type bridge composed of the four switch transistors and the motor 5.

Although not illustrated here, the vehicle speed information detected by the vehicle speed sensor is also inputted into the CPU 1, and the target current table corresponding to the information is read out. The output from the interface 43 is inputted into an adder 62 and a differential circuit 61, and the output from the differential circuit 61 is inputted into the adder 62. The output from the adder 62 is inputted into the drive inhibition circuit 7, in which the direction and magnitude of the torque added with the differential value is calculated. Furthermore, the torque is examined in the magnitude relation to the values L, R in FIG.2, and when the leftward (rightward) torque is smaller than L (R), the drive inhibition circuit 7 emits the signal of the leftward (rightward) drive inhibition. The inhibition signal of the leftward (rightward) drive is given so as to make nonconducting of the switch transistor in the drive circuit 40 relating to the leftward (rightward) drive of the motor.

In the third embodiment as described above, the operation for determining the drive direction of the motor drive in the calculation within the CPU 1 and the other operation for inhibiting the drive of the motor in the drive inhibition circuit 7 are on the same level in the sense that they reflect the differential value of the torque. That is, the former is determined by the direction of the target current calculated by adding the differential value to the target current based on the detected torque, and the latter by the torque which is the sum of the detected torque and the differential torque. As a result, the judgment of the inhibition in the drive inhibition circuit 7 is performed in a more exact manner. Namely, the inhibiting operation in the drive inhibition circuit 7 is adapted to operate when the target current (the result of the additive operation (54)) is zero or in the opposite direction.

It is preferable that the gain of the differential circuit 61 is larger than the gain of the differential operation. This is due to the following reason. That is, in the operation of the CPU 1, the current value read out from the target current table is added with the differential value, so that even if the detected torque signal is in the dead zone, the target current is not zero as far as the differential value is not zero. When the detected torque signal is in the dead zone in the drive inhibition circuit 7 and the torque value added with the differential value is in the dead zone, even if the differential value is not zero, the rightward (leftward) drive of the motor has been inhibited. Consequently, even when the detected torque signal is in the dead zone, if the differential value is not zero, the gain in the differential circuit 61 is adapted to be larger so that the torque value added with the differential value may be outside the dead zone. Thereby, the differential control in the CPU 1 is not obstructed even when the torque is in the dead zone.

Figure 3:
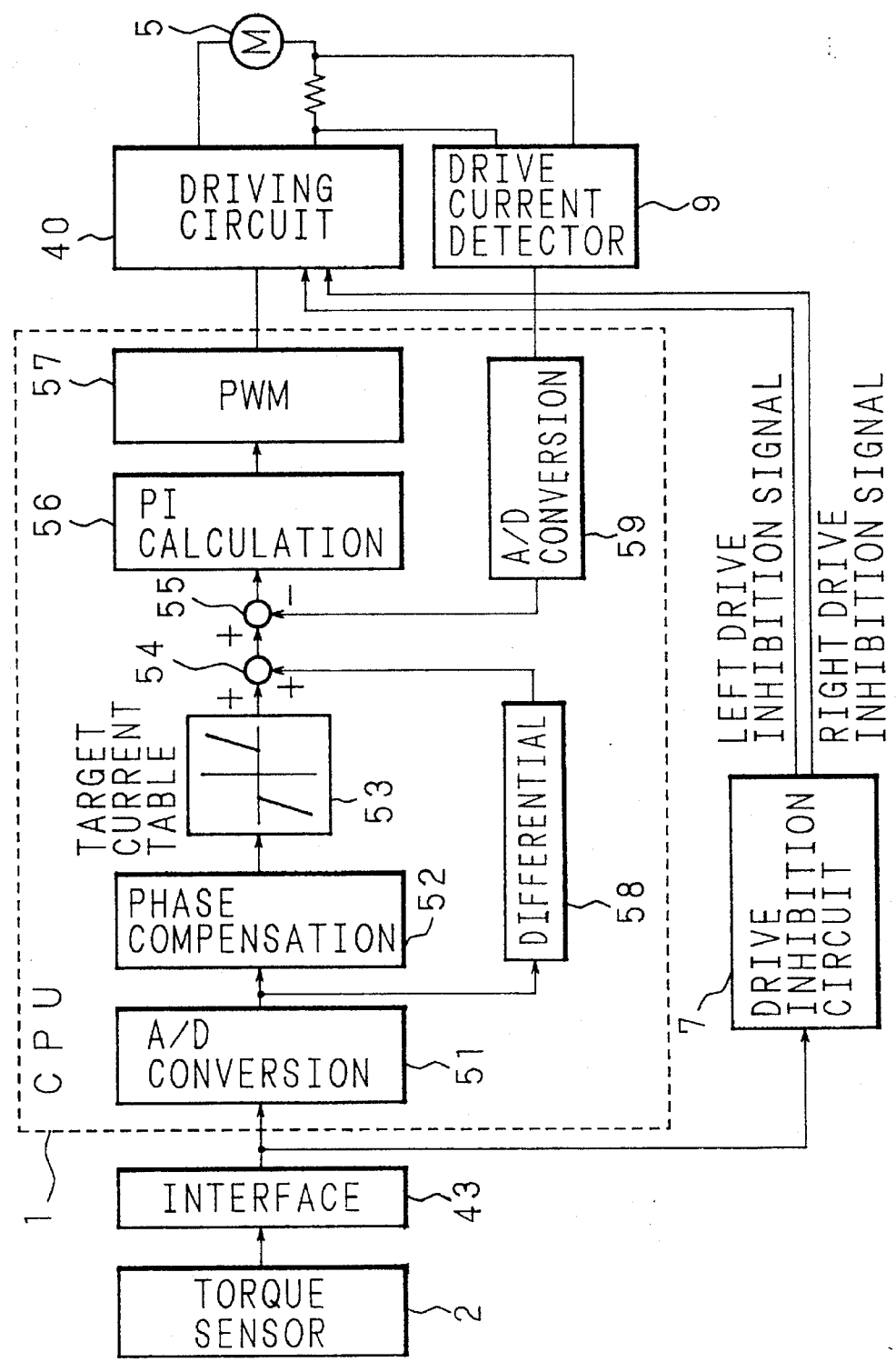
FIG.3 is a block diagram of a conventional electric power steering apparatus.
Figure 4:
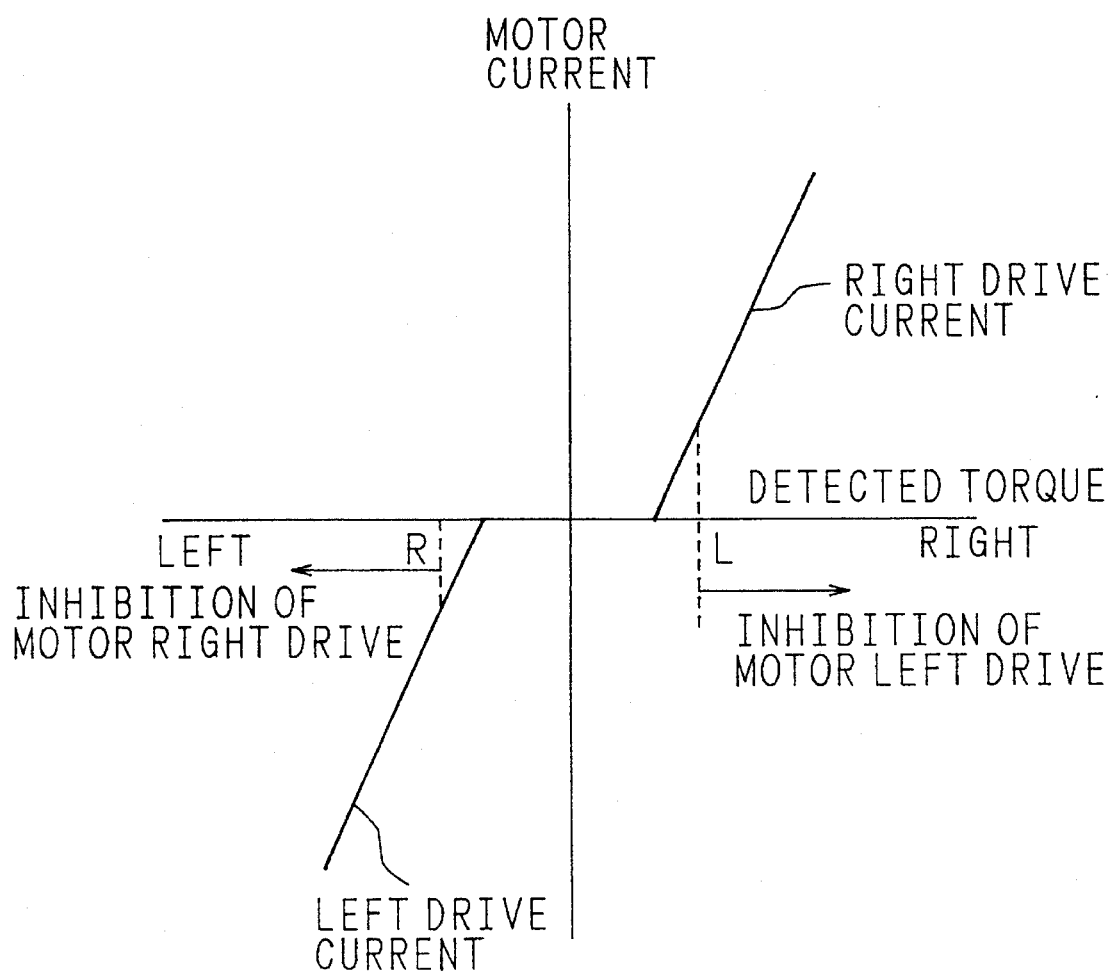
FIG.4 is a diagram showing the drive inhibition zone in an electric power steering apparatus of the invention.

FIG.10 and FIG.11 respectively show the signal wave forms of the several portions or the wave forms corresponding to the calculated values in the conventional apparatus and the third embodiment apparatus according to the invention. Both the drawings commonly show (a) the detected torque signals and (b) the read-out values from the target current table. FIG. 10(c) shows the output from the drive inhibition circuit 7 in FIG.3. FIG.10(d) shows the results of the additive operation (54) or the drive currents, in which the drive in the hatched area is inhibited, so that the inherently necessary assistance to the steering can not be performed, and the deterioration of the steering feeling is represented. On the other hand, the solid line in FIG.11 (c) shows the output from the adder 62, and the drive inhibition signal emitted as a sum of the differential and the torque signal (the dotted line) is shown in FIG.11(d). As a result, the drive current is shown in FIG.11(e). In short, the inherently necessary assistance can be performed to the steering.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An electric power steering apparatus including an electric motor which provides an assisting steering force, comprising:

a processor to which a detected signal of steering torque and direction is inputted and which outputs a drive control signal of magnitude and direction for the electric motor on the basis of the detected steering torque;

drive inhibition circuit means responsive to the detected steering torque direction which outputs a signal to stop the operation of the electric motor when the driving direction of the electric motor as directed by said processor and the direction of the detected steering torque are opposite to each other; and said processor including comparing means responsive to said drive inhibition circuit output signal and the steering torque direction signal for detecting when said drive inhibition circuit output signal is correctly stopping operation of the electric motor in the condition when the driving direction of the electric motor and the direction of the detected steering torque are opposite to each other.

2. An electric power steering apparatus as set forth in claim 1, wherein said comparing means comprises:

a logic circuit for comparing the agreement between the drive control signal from said processor for representing the driving direction of the electric motor and the output signal from said drive inhibition circuit; and means for maintaining the drive stop of the electric motor while the condition of the driving direction of the electric motor and the direction of the detected steering torque are opposite to each other as detected by said logic circuit continues for a predetermined time period.

3. An electric power steering apparatus as set forth in claim 1, further comprising:

means for comparing the detected steering torque and direction with a predetermined value, and said drive inhibiting circuit means inhibiting the drive of the electric motor in the direction opposite to that of the detected steering torque when the detected steering torque is not smaller than said predetermined value.

4. An electric power steering apparatus as set forth in claim 1, further comprising:

first circuit means for calculating a differential signal of a signal corresponding to the detected steering torque;

second circuit means for calculating the sum of the differential signal calculated by said first circuit means and the signal corresponding to the detected steering torque; and said drive inhibition circuit means inhibiting the drive of the electric motor on the basis of the sum calculated by said second circuit means.

5. An electric power steering apparatus as set forth in claim 4, further comprising:

differentiating means for calculating a differential signal of the detected steering torque;

said processor driving the electric motor on the basis of the sum of the current value determined according to the detected steering torque and the output of said differentiating means.

6. An electric power steering apparatus as set forth in claim 5, wherein a gain of said first circuit is greater than a gain of said differentiating means.

* * * * *